(12) United States Patent
Yang et al.

(10) Patent No.: US 11,631,906 B2
(45) Date of Patent: Apr. 18, 2023

(54) PROTECTION CIRCUIT BOARD CAPABLE OF EASILY CHECKING WELDED STATE BETWEEN ELECTRODE TERMINAL AND CONNECTION PART THEREOF AND SECONDARY BATTERY PACK COMPRISING THE SAME

(71) Applicant: LG CHEM, LTD., Seoul (KR)

(72) Inventors: Jin Oh Yang, Daejeon (KR); Young Su Son, Daejeon (KR); Suk Jin Song, Daejeon (KR); Jae Young Jang, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 356 days.

(21) Appl. No.: 17/085,728

(22) Filed: Oct. 30, 2020

(65) Prior Publication Data

US 2021/0050629 A1 Feb. 18, 2021

Related U.S. Application Data

(62) Division of application No. 15/799,375, filed on Oct. 31, 2017, now Pat. No. 10,862,173.

(30) Foreign Application Priority Data

Oct. 31, 2016 (KR) .................. 10-2016-0143301

(51) Int. Cl.
*H01M 10/48* (2006.01)
*H01M 50/20* (2021.01)
*H01M 10/42* (2006.01)

(52) U.S. Cl.
CPC ....... *H01M 10/4257* (2013.01); *H01M 10/48* (2013.01); *H01M 50/20* (2021.01); *H01M 2010/4271* (2013.01); *H01M 2200/00* (2013.01)

(58) Field of Classification Search
None
See application file for complete search history.

(56) References Cited

U.S. PATENT DOCUMENTS

2011/0163755 A1 7/2011 Jiang et al.
2011/0262777 A1 10/2011 Choi et al.
2014/0302372 A1 10/2014 Kim et al.

*Primary Examiner* — Tracy M Dove
(74) *Attorney, Agent, or Firm* — Birch, Stewart, Kolasch & Birch, LLP

(57) ABSTRACT

A protection circuit board includes a printed circuit board having a circuit is printed on a board formed from an electrically insulating material and two or more connection components disposed on at least one surface of the printed circuit board and are coupled to an electrode terminal of a secondary battery. Additionally, at least one inspection slot having a shape recessed within the connection component and extending to a portion that the electrode terminal of the secondary battery is coupled thereto and is defined in the connection component. Also, an inspection device and inspection method for inspecting a welded state between a protection circuit board and an electrode terminal among a pair of electrode terminals of a battery pack are provided.

7 Claims, 9 Drawing Sheets

-- PRIOR ART --

PROTECTION CIRCUIT BOARD CAPABLE OF EASILY CHECKING WELDED STATE BETWEEN ELECTRODE TERMINAL AND CONNECTION PART THEREOF AND SECONDARY BATTERY PACK COMPRISING THE SAME

CROSS-REFERENCE TO RELATED APPLICATIONS

This application is a Divisional of U.S. patent application Ser. No. 15/799,375 filed on Oct. 31, 2017, which claims priority to Korean Patent Application No. 10-2016-0143301 filed on Oct. 31, 2016, the entire contents of which are hereby expressly incorporated by reference into the present application.

BACKGROUND OF THE INVENTION

Technical Field

The present disclosure relates to a protection circuit board and more particularly, a protection circuit board for more easily determining a welded state between an electrode terminal and a connection component and a secondary battery including the same.

Background Art

Recently, demands of rechargeable secondary batteries have rapidly increased due to the increasing of technical development and demands of mobile devices and the development of electric vehicles for replacing gasoline vehicles and diesel vehicles. Among the rechargeable secondary batteries, lithium secondary batteries are widely used as energy sources for various electronic products, electric vehicles and mobile devices because the lithium secondary batteries have high energy density, high operation voltage and improved battery life characteristics.

However, since the lithium secondary battery contains various combustibles, the lithium secondary battery has the possibility of risk that includes overheating and explosion caused by overcharge, overcurrent, and external physical shock and thus, have a considerable safety limitation. Accordingly, a protection circuit module (PCM) that effectively controls an abnormal state such as overcharge is embedded in the lithium secondary battery while being connected to the secondary battery.

The PCM includes a field effect transistor (FET) that is a switching element that regulates a current and a passive element such as a voltage detector, a resistor, and a condenser. The PCM may block the overcharge, overdischarge, overcurrent, short-circuit and inverse voltage of the secondary battery to prevent the secondary battery from being exploded, overheated, or deteriorated in charge and discharge characteristics and suppress degradation in electric performance and physical-chemical abnormal behavior. Accordingly, the risk factor is reduced and the lifespan is extended. The PCM includes a protection circuit board (PCB) that the protection circuit is disposed on and a module case in which the PCB is accommodated. The battery pack is coupled to an exterior surface of a main body of the secondary battery when the PCB is coupled to the module case and is manufactured to be coupled to the secondary battery.

Further, the PCB having a plate shape includes an electric conductive connection component disposed on one surface thereof to be electrically connected to the protection circuit and the main body of the battery and an external input-output terminal that is connected to an external device such as a wireless terminal, a notebook and an electric vehicle. Accordingly, for electric connection between the PCB and the main body of the secondary battery electrode terminals of the secondary battery are coupled to the connection components of the PCB through welding and soldering.

In particular, although the connection component of the PCB is welded to the electrode terminal, when the welding condition is insufficient, a welding coupling force therebetween may be minimal and be determined to be a failure. As described above, when the inspection is performed on the welded state of the secondary battery including the PCB, conventionally a welding quality is manually inspected for detachment of the electrode terminal using the inspection tip. Since forces applied to the inspection tip vary during manual inspection and the electrode terminal is deformed while being detached by the inspection tip, the welding state inspection through the manual operation generates a secondary limitation.

FIG. 1 is exemplary photographs of the related art showing a welded structure between a PCB and an electrode terminal, depicting a manual inspection during a welded state using an inspection tip. As shown in FIG. 1, since an inspection is performed when the inspection tip is forcedly inserted between an electrode terminal and a connection component 20 of a PCB using an inspection method that manually detaches a welded portion using the inspection tip, the electrode terminal 10 is unavoidably damaged. Since the damaged electrode terminal 10 generates increase in resistance with a negative influence on a performance of the second battery, techniques for fundamentally solving a limitation generated in the above welded state process and a limitation on quality degradation in a process of manufacturing a battery are highly demanded.

The above information disclosed in this section is merely for enhancement of understanding of the background of the disclosure and therefore it may contain information that does not form the prior art that is already known in this country to a person of ordinary skill in the art.

SUMMARY OF THE INVENTION

The present disclosure provides a protection circuit board for more easily determining a welded state between an electrode terminal and a connection component and a secondary battery including the same. In an aspect of an exemplary embodiment of the present disclosure a protection circuit board may include a secondary battery having an electrode terminal that is electrically and physically coupled to the protection circuit board to form a battery pack, a printed circuit board having a circuit printed on a board formed from an electrically insulating material and two or more connection components disposed on a surface of the printed circuit board and electrically and physically coupled to the electrode terminal of a secondary battery. An inspection slot may have a shape recessed within the connection component and extending to a portion that the electrode terminal of the secondary battery is coupled to is defined in the connection component.

In some exemplary embodiments, the protection circuit board may include the inspection slot having a cavity that an inspection tip passes through between the connection component and the electrode terminal to monitor a coupling force therebetween when a connection component and an electrode terminal of a secondary battery are coupled to each other. In other exemplary embodiments, the protection circuit may include the connection component having a conductive metal plate coupled to the electrode terminal through welding when the connection component abuts the electrode terminal of the secondary battery. In another exemplary embodiment, the protection circuit board may include the connection component having a structure that includes at least two metal plates attached to the circuit board while being spaced a predetermined distance from each other and an inspection slot may be formed by the cavity between the metal plates.

In other exemplary embodiments, the protection circuit board may include the inspection slot having a depth that corresponds to a thickness of the metal plate with reference to the circuit board. In some exemplary embodiments, the protection circuit board may include the connection component having a structure that includes four metal plates coupled to the circuit board while being spaced a predetermined distance from each other to form an inspection slot having a cross-shape on a plane.

In another exemplary embodiment, the protection circuit board may include the connection component being a metal plate and the inspection slot having a structure, in which the metal plate is recessed toward the circuit board at a position that corresponds to a central portion of the metal plate. The protection circuit board may include the metal plate having a recessed depth that is about 50% to about 90% of a thickness of the metal plate except for the inspection slot. The protection circuit board may include the connection component having a portion of the metal plate except for the inspection slot coupled to the electrode terminal through resistance welding, ultrasonic welding, or laser welding.

The protection circuit board may include an end of the circuit board having two or more recessed-type grooves and when the recessed-type grooves are engaged with a projection disposed on a PCB accommodation case or a pack housing of a battery pack, the circuit board may be coupled to the pack housing.

In another aspect of an exemplary embodiment, of the present disclosure, a battery pack may include a plate-type secondary battery having a pair of electrode terminals disposed in parallel to each other that protrude outward, a protection circuit board and a pack housing with the protection circuit board and the secondary battery disposed therein.

In some exemplary embodiments, battery pack may include the battery pack disposed in a pack housing that includes at least two secondary battery accommodation components surrounding an outer circumferential surface of the secondary battery when a secondary battery array having electrode terminals of a pair of secondary batteries are arrayed in a planar arrangement to face each other has an opened top or bottom surface. The protection circuit board may be disposed in the pack housing when the connection components of the protection circuit board are electrically and physically coupled to the electrode terminal between the secondary batteries facing each other. The battery pack may be disposed in the pack housing having at least one secondary battery accommodation component surrounding an outer circumferential surface of the secondary battery when at least one secondary battery has an opened top or bottom surface and the protection circuit board may be coupled to the pack housing when the connection components of the circuit board are electrically and physically coupled to the electrode terminals at an upper end portion of the pack housing.

In some exemplary embodiments, the battery pack may include a cover member coupled to the pack housing to cover the opened top or bottom surface. The battery pack may include the pack housing having an anti-sliding projection configured to prevent displacement of the secondary batteries at each position that corresponds to an end of the secondary batteries where the electrode terminals are disposed and a protrusion coupled to the recessed-type groove in the circuit board of the protection circuit board disposed on the anti-sliding projection.

In another exemplary embodiment, an inspection device for inspecting a welded state between the protection circuit board and the electrode terminal of the battery pack may include at least two inspection tips that abut the electrode terminals when the inspection tips pass through an inspection slot in the connection component and a jig having the inspection tips disposed thereon to position the inspection tips to correspond to the connection components and configured to apply a predetermined pressure to the inspection tips to push the electrode terminals from the connection components by the inspection tips.

In another aspect an exemplary embodiment of the present disclosure a method for inspecting a welded state between the electrode terminal and the protection circuit board by using the inspection device may include inserting at least two inspection tips into inspection slots of connection components different from each other and applying a predetermined pressure to the inspection tips to determine whether the electrode terminal is separated from the connection component.

BRIEF DESCRIPTION OF THE DRAWINGS

Exemplary embodiments may be understood in more detail from the following description taken in conjunction with the accompanying drawings, in which.

DETAILED DESCRIPTION

Figure 1:
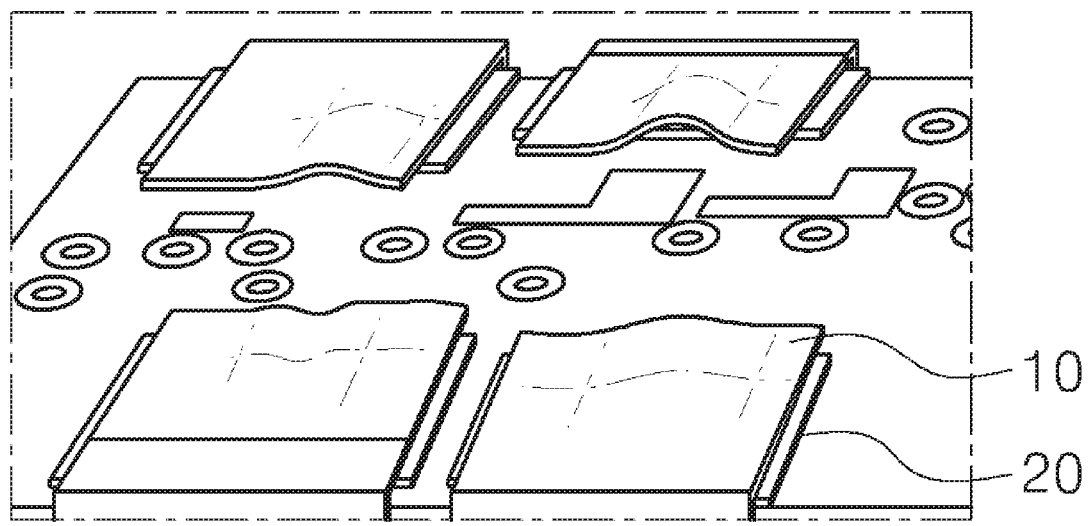
FIG. 1 show exemplary photographs of a welded structure between an electrode and a PCB, in which a welded state is inspected by a worker using an inspection tip according to the related art.

Hereinafter, specific embodiments will be described in detail with reference to the accompanying drawings. The present disclosure may, however, be embodied in different forms and should not be construed as limited to the embodiments set forth herein.

Hereinafter, embodiments of the present disclosure will be described with reference to the accompanying drawings. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure is provided to solve a limitation of the related art and a technical subject requested from the past. In particular, the present disclosure provides a protection circuit board capable of more easily determining a welded state between an electrode terminal and a connection component and preventing the terminal electrode and the connection component from being damaged and a secondary battery including the same.

In accordance with an exemplary embodiment, a protection circuit board electrically and physically coupled to an electrode terminal of a secondary battery to configure a battery pack may include a printed circuit board having a circuit printed on a board formed from an electrically insulating material and two or more connection components disposed on a surface of the printed circuit board and electrically and physically coupled to an electrode terminal of a secondary battery. For example, at least one inspection slot having a shape recessed within the connection component and extending to a portion coupled to the electrode terminal of the secondary battery is defined in the connection component.

In other words, since the inspection slot provides a cavity that an inspection tip to determine a coupling force therebetween passes between the connection component and the electrode terminal when the connection component and the electrode terminal of the secondary battery are coupled to each other, the protection circuit board in accordance with an exemplary embodiment may more easily determine a welded state between the electrode terminal and the connection component and may prevent the electrode terminal and the connection component from being damaged.

In an exemplary embodiment, the protection circuit board in accordance with an exemplary embodiment may have a mechanical coupling structure for more easily coupling the protection circuit board when a battery pack is formed. In particular, at least two recessed-type grooves may be defined in an end of the circuit board, and as the recessed-type grooves are engaged with the protrusion provided on a PCB accommodation case or a pack housing of the battery pack, the circuit board may be mechanically coupled to the pack housing.

In an exemplary embodiment, the connection component formed from a conductive metal plate may be coupled to the electrode terminal through welding when the connection component abuts (e.g., is in surface-contact) with the electrode terminal of the secondary battery. In other words, the connection component may be a portion coupled to the electrode terminal on the circuit board and as the metal plate configuring the connection component may be coupled to the electrode terminal, the protection circuit board may be electrically coupled to the secondary battery. Additionally, in the connection component, as at least a portion of the metal plate except for the inspection slot may be coupled to the electrode terminal through resistance welding, ultrasonic welding, or laser welding, the protection circuit board may be physically coupled to the secondary battery.

In an exemplary embodiment, the connection component may have a structure with at least two metal plates coupled to the circuit board while being spaced a predetermined distance from each other and an inspection slot may be a cavity between the metal plates. In the above-described structure, the inspection slot may have a depth that corresponds to a thickness of the metal plate with reference to the circuit board. The predetermined distance may represent a distance by which the inspection tip is coupled and a coupling surface area between the electrode terminal and the connection component may be maximized. In particular, the predetermined distance may be about 5% to about 10% of a length of the electrode terminal disposed on the connection component.

The length of the electrode terminal disposed on the connection component may represent a longitudinal or transverse length of the electrode terminal disposed on the connection component on a plane. When the metal plates are spaced apart from each other in a direction that corresponds to a transverse of the electrode terminal, the predetermined distance may be designed with reference to the width of the electrode terminal. Additionally, when the metal plates are spaced apart from each other in a direction that corresponds to the height of the electrode terminal, the predetermined distance may be designed with reference to the height of the electrode terminal. In some cases, the connection component may have a structure with four metal plates coupled to the circuit board when being spaced a predetermined distance from each other to form an inspection slot having a cross-shape on a plane.

In the above-described structure, when the inspection tip passes through in each of the transverse and longitudinal directions, welded states between the electrode terminal and the connection component in both the transverse and longitudinal directions may be inspected. In an exemplary embodiment, the connection component may be a metal plate. The inspection slot having a structure with the metal plate recessed toward the circuit board at a position that corresponds to a virtual line crossing a central portion of the metal plate may be defined on the metal plate.

In the above-described structure, since, in the recessed structure of the metal plate, when the depth increases (e.g., is excessively deep) and the depth of the metal plate in the inspection slot is reduced, resistance at the inspection slot caused by carrying current may increase. On the contrary, when the thickness increases the metal plate may contact the electrode terminal and the inspection slot may be welded. Accordingly, the inspection tip may not pass therethrough. Thus, in an exemplary embodiment, the metal plate may have a recessed depth that is about 50% to about 90% of a thickness of the metal plate except for the inspection slot.

In accordance with another exemplary embodiment, a battery pack may include at least one plate-type secondary battery having a pair of electrode terminals disposed in parallel to each other that protrude outward, a protection circuit board, and a pack housing with the protection circuit board and the secondary battery disposed therein.

In an exemplary embodiment, the battery pack may be disposed in a pack housing that may include at least two secondary battery accommodation components surrounding an outer circumferential surface of the secondary battery when a secondary battery array having electrode terminals of a pair of secondary batteries arrayed in a planar manner to face each other has an opened top or bottom surface and the protection circuit board may be disposed in the pack housing with the connection component of the protection circuit board electrically and physically coupled to electrode terminal between the secondary batteries facing each other.

In an exemplary embodiment, the battery pack may be disposed in the pack housing including at least one secondary battery accommodation component surrounding an outer circumferential surface of the secondary battery when at least one secondary battery has an opened top or bottom surface and the protection circuit board may be coupled to the pack housing when connection components of the circuit board are electrically and physically coupled to the electrode terminals at an upper end portion of the pack housing. In an exemplary embodiment, the battery pack may further include a cover member coupled to the pack housing to cover the opened top or bottom surface.

In an exemplary embodiment, the pack housing may have an anti-sliding projection configured to prevent displacement of the secondary batteries at each of the positions corresponding to ends of secondary batteries where the electrode terminals are disposed and a protrusion engaged with the recessed-type groove defined in the circuit board of the protection circuit board may be disposed on the anti-sliding projection. Alternatively, the battery pack may have a structure with the electrode terminal and the connection component of the protection circuit board electrically and physically coupled to each other and the pack housing mounted on an outer surface of the secondary battery when the protection circuit module having a structure with the protection circuit board is disposed on the PCB accommodation case positioned on an upper end of the secondary battery.

In accordance with another exemplary embodiment, an inspection device for inspecting a welded state between the protection circuit board and the electrode terminal of the battery pack may include at least two inspection tips that abut (e.g., closely contact) the electrode terminals when the inspection tips pass through an inspection slot defined in the connection component and a jig that the inspection tips are disposed on at positions corresponding to the connection components and configured to apply a predetermined pressure to the inspection tips to push the electrode terminals from the connection components by the inspection tips.

In accordance with still another exemplary embodiment, a method for inspecting a welded state between the electrode terminal and the protection circuit board by using the inspection device may include inserting at least two inspection tips into inspection slots of connection components different from each other and applying a predetermined pressure to the inspection tips to determine whether the electrode terminal is separated from the connection component.

Although a type of the battery cell is not particularly limited, a specific example of the batter cell may include a lithium secondary battery such as a lithium ion battery and a lithium ion polymer battery having high energy density, high discharge voltage, and output stability. In general, the lithium secondary battery may include a positive electrode, a negative electrode, a separator, and a non-aqueous electrolytic solution containing a lithium salt. The positive electrode may be manufactured, e.g., by applying a mixture of a positive electrode active material, a conductive material, and a binder onto a positive electrode collector and/or an extended collecting component and then drying, and when necessary, a filler may be further added to the mixture.

In general, the positive current collector and/or the extended current collecting component may have a thickness of about 3 μm to about 500 μm. The positive current collector and the extended current collecting component are not particularly limited as long as they have high electrical conductivity without causing a chemical change in the corresponding battery. For example, the positive electrode collector and the extended current collecting component may be formed of stainless steel, aluminum, nickel, titanium, baking carbon or aluminum or stainless steel with a surface treated with carbon, nickel, titanium, or silver. The collector may have an uneven surface to improve bonding strength with an active material and be manufactured in various forms such as a film, a sheet, foil, a net, a porous body, a foam body, or a non-woven fabric.

For example, electrode active material may be divided into a cathode active material and an anode active material. The cathode active material may include, for example, a layered compound such as lithium cobalt oxide ($LiCoO_2$) and lithium nickel oxide ($LiNiO_2$) or a compound substituted with one or more transition metals, a lithium manganese oxide expressed as chemical formula $Li1+yMn_2-yO_4$ (where, y=0 to 0.33), $LiMnO_3$, $LiMn_2O_3$, and $LiMnO_2$; lithium copper oxide ($Li_2CuO_2$), vanadium oxide such as $LiV_3O_8$, $LiFe_3O_4$, $V_2O_5$, $Cu_2V_2O_7$; a Ni site type lithium nickel oxide expressed as chemical formula $LiNi_{1-y}M_yO_2$ (where, M=Co, Mn, Al, Cu, Fe, Mg, B or Ga and y=0.01 to 0.3), a lithium manganese composite oxide expressed as chemical formula $LiMn_{2-y}M_yO_2$ (where, M=Co, Ni, Fe, Cr, Zn or Ta, and y=0.01 to 0.1) or $Li_2Mn_3MO_8$ (where, M=Fe, Co, Ni, Cu or Zn), $LiMn_2O_4$ in which a part of Li in the chemical formula is substituted by alkali earth element ion; disulfide compound; and $Fe_2(MoO_4)_3$, but it is not limited thereto.

The mixture including the positive electrode active material may include about 1% to about 50% by weight of the conductive material. The conductive material is not particularly limited when it does not cause a chemical change and has conductivity, which may include, for example, graphite such as natural graphite or artificial graphite; carbon black such as carbon black, acetylene black, ketjen black, channel black, furnace black, lamp black, summer black; conductive fibers such as carbon fibers and metallic fibers; metal powder such as carbon fluoride, aluminum, and nickel powder; conductive whiskers such as zinc oxide and potassium titanate; conductive metal oxides such as titanium oxide; or conductive materials such as polyphenylene derivatives.

The binder may be an element to assist combining an active material with conductive material and combination of current collector, and typically added by about 1 to about 30 weight % based on a total weight of a mixture containing a cathode active material. For example, the binder may include polyfluorovinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene-terpolymer (EPDM), sulfonated EPDM, stylene butylene rubber, fluoro rubber or various copolymers.

A filler may be any material for suppressing swelling of the positive electrode, provided that the filler does not cause a chemical change in the battery and has a fibrous structure. For example, the filler may include an olefin-based copolymer such as polyethylene and polypropylene; or a fibrous material such as glass fiber and carbon fiber. The negative electrode may be formed by applying a negative electrode material on the negative electrode collector and drying it and may include the above-described components.

In general, the positive current collector and/or the extended current collecting component may have a thickness of about 3 μm to about 500 μm. The negative current collector and/or the extended current collecting component are not particularly limited as long as they have electrical conductivity without causing a chemical change in the corresponding battery. For example, the negative current collector may include copper, stainless steel, aluminum, nickel, titanium, baking carbon, copper or stainless steel with a surface treated with carbon, nickel, titanium, or silver, or an aluminum-cadmium alloy. Also, like the cathode collector, the anode collector may have an uneven surface to improve bonding strength with an active material and be manufactured in various forms such as a film, a sheet, foil, a net, a porous body, a foam body or a non-woven fabric.

The anode active material may include, carbon such as graphitizing carbon and graphite-based carbon; a complex metal oxide such as $Li_xFe_2O_3 (0 \leq x \leq 1)$, $Li_xWO_2 (0 \leq x \leq 1)$, and $Sn_xMe_{1-x}Me'_yO_z$ (Me: Mn, Fe, Pb, Ge; Me': Al, B, P, Si, Group 1, Group 2, and Group 3 elements of the Periodic Table, halogen; $0 < x \leq 1$; $1 \leq y \leq 3$; $1 \leq z \leq 8$); lithium metal; lithium alloy; silicon-based alloy; tin-based alloy; metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene and Li—Co—Ni based materials.

The separator may be interposed between the positive electrode and the negative electrode and an insulating thin film having high ion permeability and mechanical strength may be used as the separator. The separator may have a pore diameter of about 0.01 μm to about 10 μm and a thickness of about 5 μm to about 300 μm. For example, the separator may include an olefin-based polymer such as polypropylene that has chemical resistance and hydrophobicity and a sheet or a non-woven fabric made of a glass fiber and polyethylene. When a solid electrolyte such as a polymer is used as the electrolyte, the solid electrolyte may serve as the separator.

The electrolytic solution may be the non-aqueous electrolytic solution containing the lithium salt, which includes the non-aqueous electrolytic solution and the lithium salt. The non-aqueous electrolytic solution may include a non-aqueous organic solution, an organic solid electrolyte, and an inorganic solid electrolyte, but is not limited thereto. For example, the non-aqueous electrolyte may include an aprotic organic solvent such as N-methyl-2-pyrrolidone, propylene carbonate, ethylene carbonate, butylene carbonate, dimethyl carbonate, diethyle carbonate, gamma-butyrolacton, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric acid tri-ester, trimethoxy methane, dioxolane derivatives, sulfolan, methyl sulfolan, 1,3-dimethyl-2-imidazolidinone, a propylene carbonate derivative, a tetrahydrofuran derivative, ether, methyl propionate, and ethyl propionate.

For example, the organic solid electrolyte may include a copolymer including a polyethylene derivative, a polyethylene oxide derivative, a polypropylene oxide derivative, a phosphoric acid ester polymer, poly agitation lysine, polyester sulfide, polyvinyl alcohol, poly vinylidene fluoride, or an ionic disintegrator.

For example, the inorganic solid electrolyte may include an Li-based nitride such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$, a nitride, a halide, or a sulfate.

For example, the lithium salt may include a material easily dissolved in the non-aqueous electrolyte, such as $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lithium lower aliphatic carbonate, lithium 4-phenyl borate, imide and the like.

Further, the following compounds may be added to the non-aqueous electrolyte in order to improve discharge and charge characteristics and flame retardancy. Examples include pyridine, triethyl phosphite, triethanolamine, cyclic ether, ethylenediamine, n-glyme, hexaphosphoric triamide, a nitrobenzene derivative, sulfur, a quinone-imine dye, N-substituted oxazolidinone, N,N-substituted imidazolidine, ethylene glycol dialkyl ether, an ammonium salt, pyrrole, 2-methoxyethanol, and aluminum trichloride. In order to provide incombustibility to the electrolyte, the electrolyte may further include a halogen-containing solvent such as carbon tetrachloride and ethylene trifluoride. Further, in order to improve high-temperature storage characteristics, the electrolyte may include carbon dioxide gas.

In an exemplary embodiment, the non-aqueous electrolyte containing the lithium salt may be prepared by adding the lithium salt such as, $LiPF_6$, $LiClO_4$, $LiBF_4$, $LiN(SO_2CF_3)_2$ into a high dielectric solution such as EC or a mixed solution in which cyclic carbonate of OC and chain carbonate of a low viscous solution such as DEC, DMC, or EMC are mixed.

Hereinafter, specific embodiments will be described in detail with reference to the accompanying drawings. The present disclosure may, however, be embodied in different forms and should not be construed as limited to the embodiments set forth herein.

Figure 2:
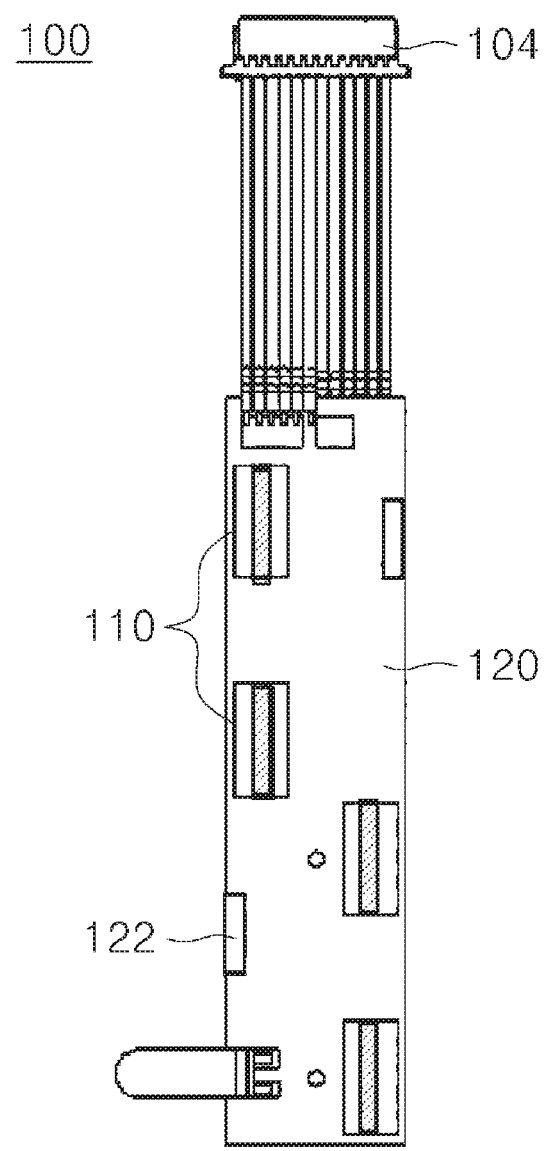
FIG. 2 is an exemplary schematic view of a protection circuit board in accordance with an exemplary embodiment of the present disclosure.

FIG. 2 is an exemplary schematic view of a protection circuit board 100 in accordance with an exemplary embodiment. Referring to FIG. 2, the protection circuit board 100 may include a circuit board 120 having a circuit printed on a board formed from an electric insulation material and a plurality of connection components 110 disposed on one surface of the circuit board 120 and coupled to an electrode terminal of a secondary battery in an electrical and physical manner.

Additionally, the protection circuit board 100 may further include an external input-output (I/O) cable 104 disposed on one side end of the circuit board 120 and connectable to an external device. A recessed groove 122 may be disposed in other ends of the circuit board 120. For example, as illustrated in FIG. 6, the recessed groove 122 may engage with a protrusion 324 disposed on a pack housing 320 of the battery pack 300, to enable the circuit board 120 to be mechanically coupled to the pack housing 320. An inspection slot having a recessed inward the connection component 110 and extending to a portion that the electrode terminal of the secondary battery are coupled to may be defined in each of the connection components 110. The connection components 110 and the inspection slot are illustrated in detail in FIGS. 3 to 5 as an exemplary embodiment.

Figure 3:
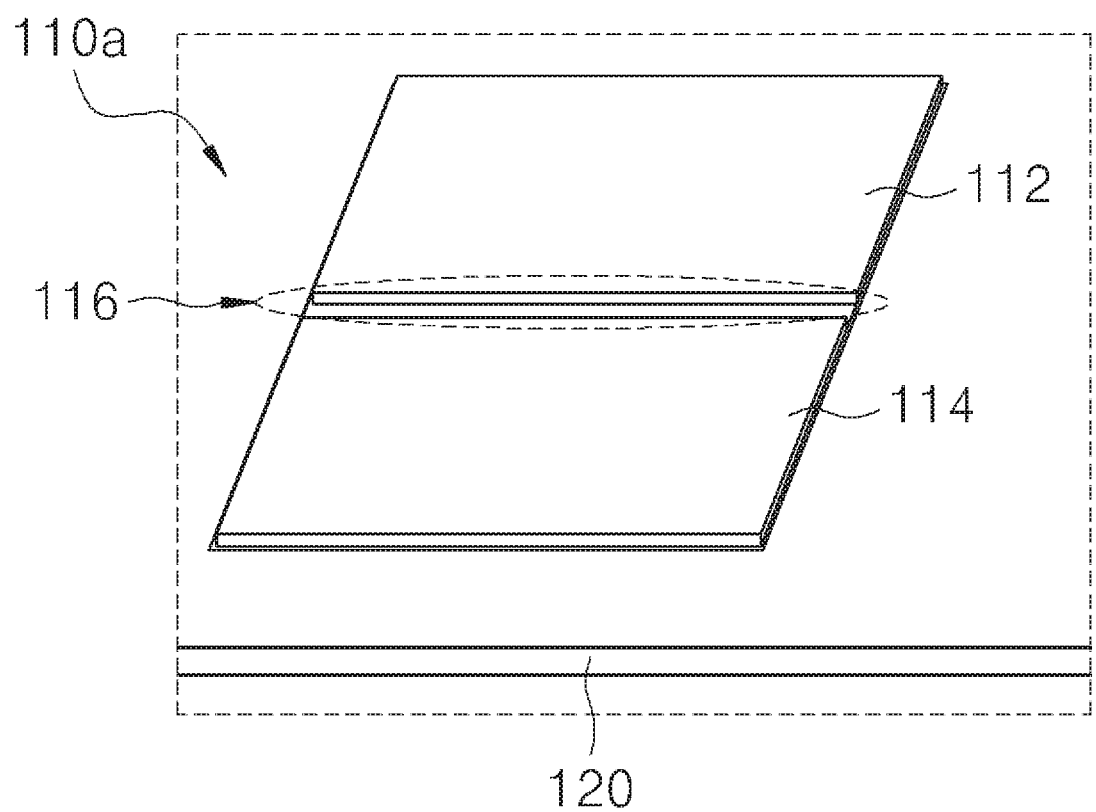
FIG. 3 is an exemplary schematic view of a connection component in accordance with an exemplary embodiment of the present disclosure.

Referring to FIG. 3, the connection component 110a may include two metal plates 112 and 114. The metal plates 112 and 114 may be coupled to the circuit board 120 while being spaced a predetermined distance from each other. For example, the inspection slot 116 may be a cavity between the metal plates 112 and 114 and the inspection slot 116 may have a depth that corresponds to the thickness of each of the metal plates 112 and 114 with reference to the circuit board 120. In other words, the connection component 110a may be a portion coupled to the electrode terminal on the circuit board 120. When the metal plates 112 and 114 configuring the connection component 110 are coupled to the electrode terminal, the PCB and the secondary battery may be electrically connected to each other.

Figure 4:
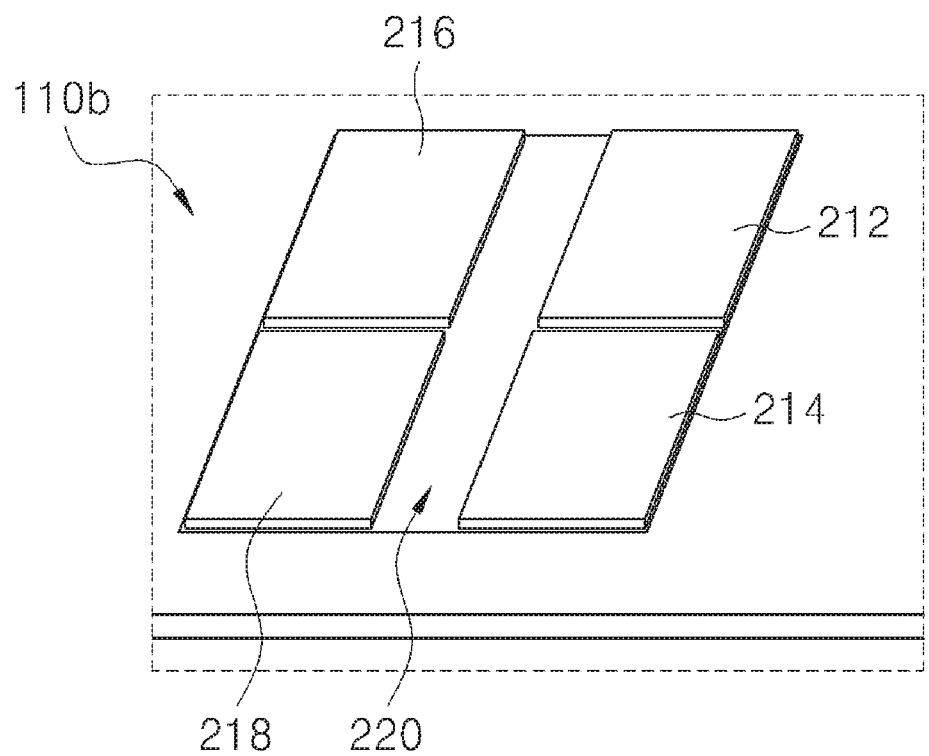
FIG. 4 is an exemplary schematic view of a connection component in accordance with another exemplary embodiment of the present disclosure.

Conversely, when a structure of the connection component 110b in FIG. 4 is reviewed, the connection component 110b may have the structure with four metal plates 212, 214, 216, and 218 coupled to the circuit board while being spaced a predetermined distance from each other to form the inspection slot 220 having a cross shape on a plane. Since the inspection slot 220 provides a passage in longitudinal and transverse directions through the above-described structure, a welded state between the electrode terminal and the connection component 110b in transverse and longitudinal directions may be inspected when the inspection tip is inserted into the passage.

Figure 5:
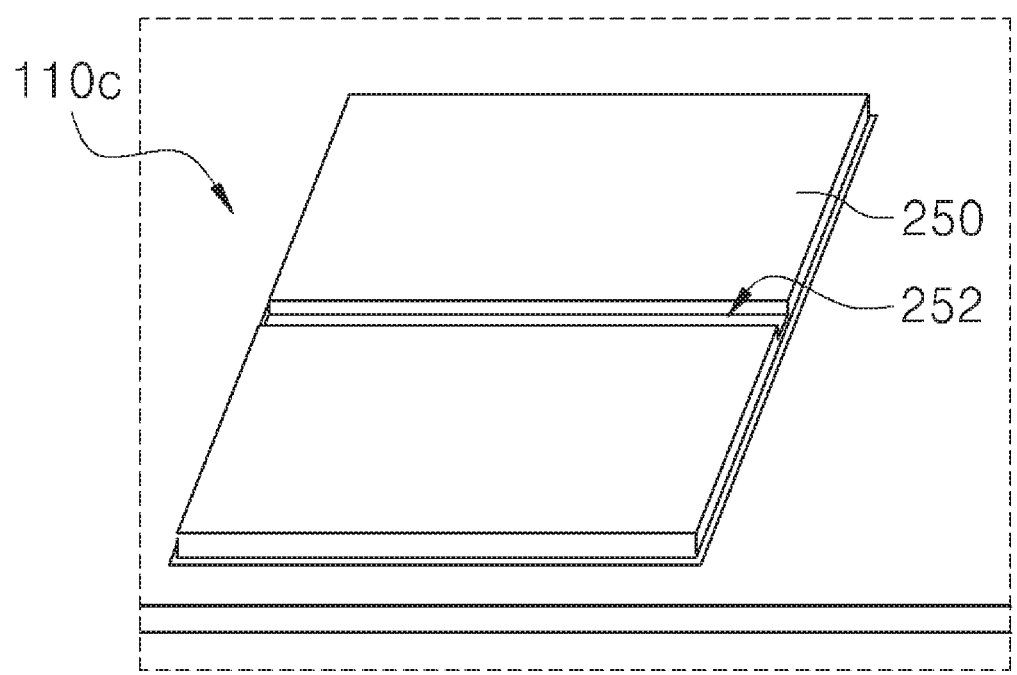
FIG. 5 is an exemplary schematic view of a connection component in accordance with another exemplary embodiment of the present disclosure.
Figure 6:
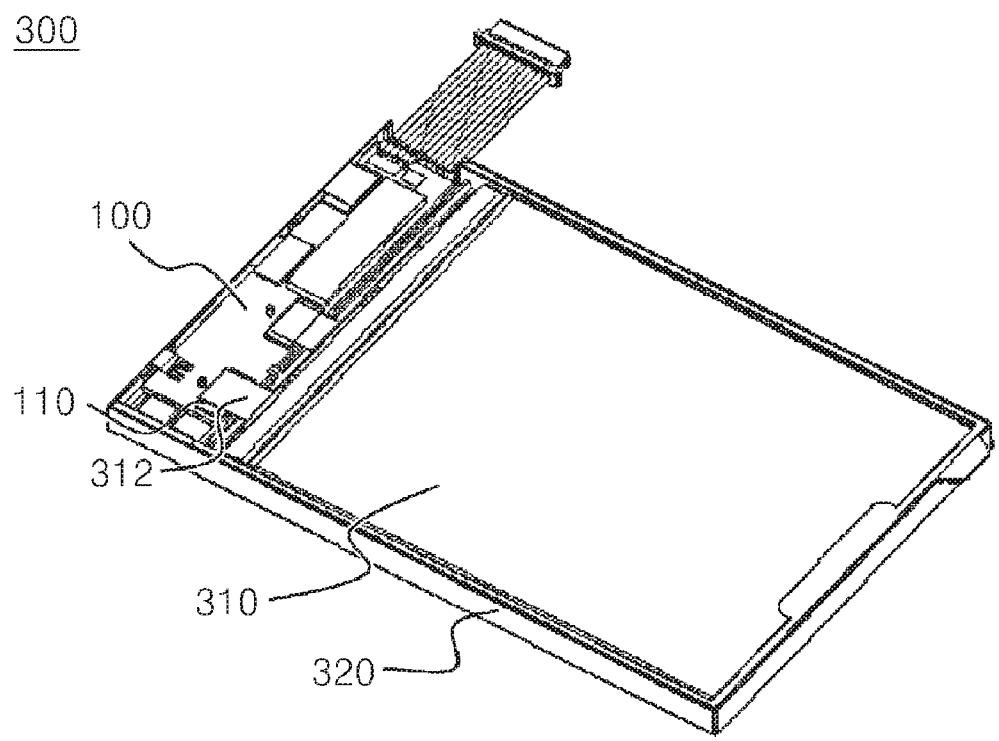
FIG. 6 is an exemplary schematic view of a battery pack in accordance with an exemplary embodiment of the present disclosure.

Further, a connection component 110c as shown in FIG. 5 may include one metal plate 250. For example, an inspection slot 252 having a structure with the metal plate 250 recessed toward the circuit board 120 may be defined in the metal plate 250 at a position corresponding to a virtual line crossing a central portion of the metal plate 250.

Figure 7:
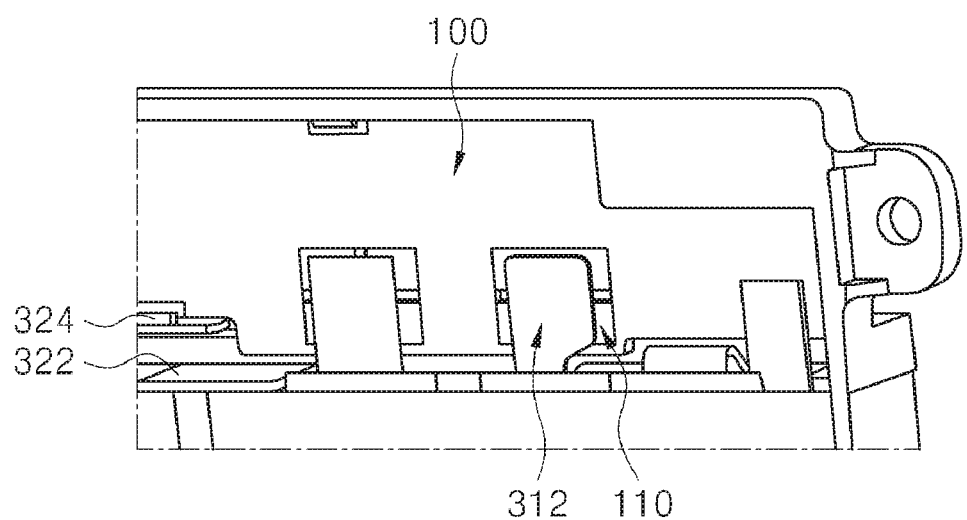
FIGS. 7 and 8 are exemplary enlarged schematic views of a coupling structure between a protection circuit board and a secondary battery according to an exemplary embodiment of the present disclosure.
Figure 8:
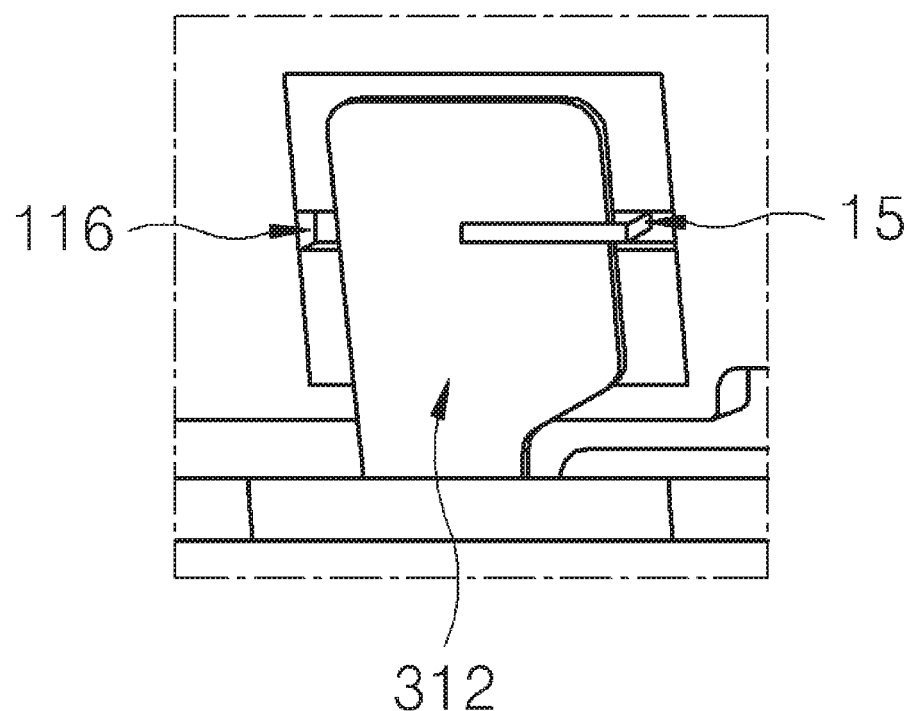

FIG. 6 is an exemplary schematic view illustrating a structure of a battery pack 300 in accordance with an exemplary embodiment. FIGS. 7 and 8 are exemplary schematic views illustrating a coupling structure between a protection circuit board 100 and a secondary battery. Referring to FIGS. 6 to 7 in conjunction with FIGS. 2 and 3, the battery pack 300 may include the secondary battery 310 coupled to the pack housing 320 including accommodation components that each accommodate one secondary battery and surround an outer circumferential surface of the secondary battery 310 when a top surface of the secondary battery 310 is opened. The protection circuit board 100 may be coupled to an upper end portion of the pack housing 320 when the connection component 110 of the protection circuit board 100 is electrically and physically coupled to the electrode terminals.

Although not separately shown in the drawings, the battery pack 300 may further include a cover member (not shown) coupled to the top surface of the pack housing 320 to surround the opened top surface of the pack housing 320. Anti-sliding projection 322 for preventing the secondary batteries from being slid may be disposed at positions that correspond to ends of the secondary batteries, at which the electrode terminals 312 are disposed. Additionally, a protrusion 324 engaged with the recessed groove 122 disposed on the circuit board 120 of the circuit protection board 100 is provided on the anti-sliding projection. When the protrusion 324 is engaged with the recessed groove 122, the protection circuit board 100 may be coupled to the pack housing 320.

The connection component 110 of the protection circuit board 100 may be coupled to the electrode terminal 312 through a spot welding when the metal plates 112 and 114 thereof are in surface-contact with the electrode terminal 312 of the secondary battery 310. For example, since the inspection slot 116 has a recessed structure, the inspection slot 116 is not in surface-contact with the electrode terminal 312. Accordingly, the inspection slot 116 provides a space through which the inspection tip 15 passes between the connection component 110 and the electrode terminal 312 to determine a coupling force therebetween when the connection component 110 and the electrode terminal 312 of the secondary battery 310 are coupled to each other. Accordingly, the present disclosure provides a technique capable of more easily determining a welded state between the electrode terminal and the connection component and preventing the electrode terminal and the connection component from being damaged during an inspection process.

Figure 9:
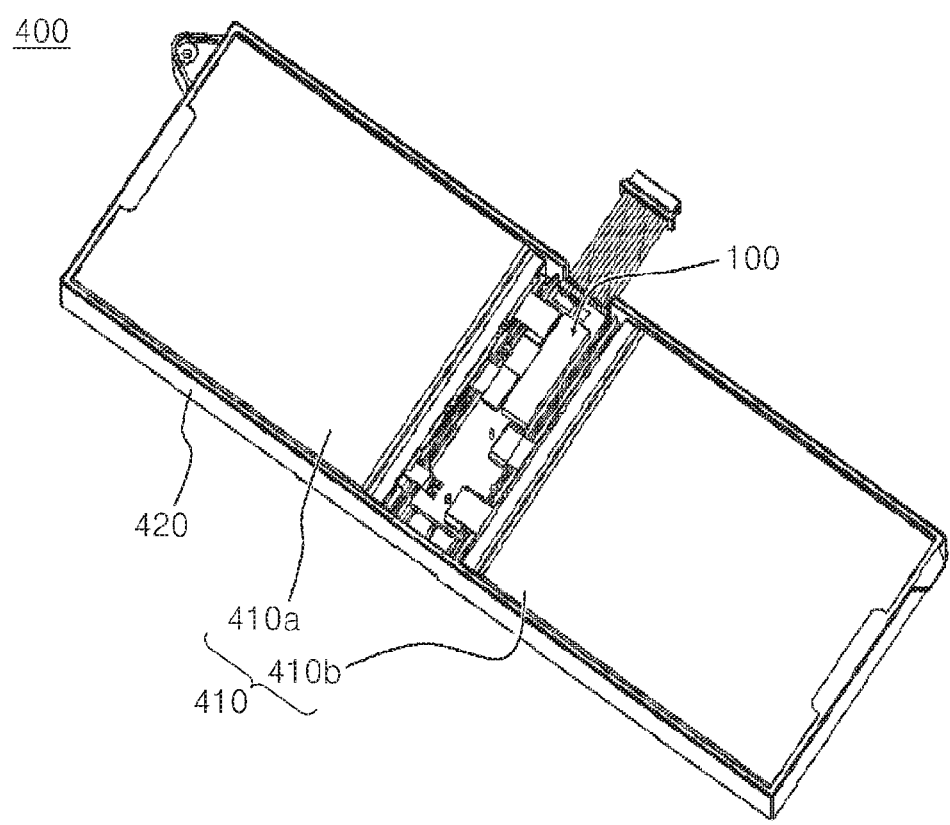
FIG. 9 is an exemplary schematic view of a battery pack in accordance with another exemplary embodiment of the present disclosure.

FIG. 9 is an exemplary schematic view of a battery pack 400 in accordance with another exemplary embodiment. Referring to FIG. 9, the battery pack 400 may be coupled to a housing 320 including two or more battery cell accommodation components surrounding outer circumferential surface of the secondary batteries 410a and 410b when a top surface of a battery cell array 410 having electrode terminals of the secondary batteries 410a and 410b arranged in a planar manner to position the electrode terminals to face each other. A protection circuit board 100 may be coupled to a pack housing 320 when a connection terminal 110 of the protection circuit board 100 is electrically and physically coupled to electrode terminals between the secondary batteries 410a and 410b facing each other. Although not separately shown in the drawings, the battery pack 300 may further include a cover member coupled to a top surface of the pack housing 320 to surround the opened top surface of the pack housing 320.

As described above, when the protection circuit board in accordance with the exemplary embodiment include the inspection slot formed in a structure in which the inspection slot provides a cavity through which the inspection tip for determining the coupling force passes through between the connection component and the electrode terminal when the connection component and the electrode terminal of the secondary battery are coupled to each other, the welded state between the electrode and the connection component may be more easily determined and the electrode terminal and the connection component may be prevented from being damaged during the inspection process.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. An inspection device for inspecting a welded state between a protection circuit board and an electrode terminal among a pair of electrode terminals of a battery pack, the inspection device comprising:
    at least two inspection tips that abut the pair of electrode terminals when the at least two inspection tips pass through an inspection slot in a connection component among a plurality of connection components disposed on a surface of a printed circuit board of the protection circuit board; and
    a jig having the at least two inspection tips disposed thereon to position the at least two inspection tips to correspond to the plurality of connection components and configured to apply a predetermined pressure to the at least two inspection tips to push the pair of electrode terminals from the plurality of connection components by the at least two inspection tips.

2. The inspection device of claim 1, wherein one of the at least two inspection tips is configured to use a cavity of the inspection slot to determine a coupling force between the connection component and the electrode terminal when the connection component and the electrode terminal of the battery pack are coupled to each other.

3. The inspection device of claim 2, wherein the inspection slot has a shape recessed within the connection component of the plurality of connection components and extends to a portion of the connection component that is coupled to the electrode terminal,
    wherein the electrode terminal and the connection component of the plurality of connection components are face to face connected at connected faces thereof, and the inspection slot is arranged between the connected faces, and
    wherein the one of the at least two inspection tip is inserted into the cavity to determine the coupling force.

4. The inspection device of claim 3, wherein the connection component includes a conductive metal plate coupled to the electrode terminal via welding when the connection component abuts the electrode terminal.

5. The inspection device of claim 4, wherein the connection component has a structure that includes the conductive metal plate being a plurality of metal plates coupled to the printed circuit board while being spaced at a predetermined distance from each other, and the inspection slot is formed by the cavity between the plurality of metal plates.

6. The inspection device of claim 2, wherein the inspection slot is arranged to bisect the connection component, and the electrode terminal is arranged to intersect the inspection slot.

7. A method for inspecting a welded state between the protection circuit board and the electrode terminal by using the inspection device of claim 1, the method comprising:
    inserting the at least two inspection tips into the inspection slot in the connection component of the plurality of connection components different from each other; and
    applying a predetermined pressure to the at least two inspection tips to determine whether the electrode terminal is separated from the connection component of the plurality of connection components.

* * * * *